United States Patent
Monereau et al.

(10) Patent No.: US 8,221,526 B2
(45) Date of Patent: Jul. 17, 2012

(54) PURIFICATION OF AN $H_2$/CO MIXTURE WITH HEATER SKIN TEMPERATURE CONTROL

(75) Inventors: Christian Monereau, Paris (FR); Guillaume Rodrigues, Guyancourt (FR); Simon Jallais, Chaville (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 422 days.

(21) Appl. No.: 12/519,618

(22) PCT Filed: Dec. 11, 2007

(86) PCT No.: PCT/FR2007/052473
§ 371 (c)(1),
(2), (4) Date: Jun. 17, 2009

(87) PCT Pub. No.: WO2008/087312
PCT Pub. Date: Jul. 24, 2008

(65) Prior Publication Data
US 2010/0031819 A1    Feb. 11, 2010

(30) Foreign Application Priority Data
Dec. 18, 2006 (FR) ........................ 06 55586

(51) Int. Cl.
*B01D 53/04* (2006.01)
*C01B 3/56* (2006.01)
(52) U.S. Cl. ............... 95/92; 95/114; 95/139; 95/148
(58) Field of Classification Search .............. 95/92, 114, 95/117, 123, 129, 135, 128, 139, 148, 236; 423/230
See application file for complete search history.

(56) References Cited

U.S. PATENT DOCUMENTS

| | | | |
|---|---|---|---|
| 5,897,686 A | 4/1999 | Golden et al. | |
| 7,128,776 B2 * | 10/2006 | Schmidt et al. | 95/115 |
| 7,309,378 B2 * | 12/2007 | Bancon et al. | 95/96 |
| 2003/0009943 A1 | 1/2003 | Millet et al. | |
| 2004/0045434 A1 * | 3/2004 | Golden et al. | 95/96 |
| 2006/0117952 A1 * | 6/2006 | Bancon et al. | 95/96 |
| 2006/0199723 A1 * | 9/2006 | Lang | 502/20 |
| 2010/0024641 A1 * | 2/2010 | Monereau et al. | 95/93 |

FOREIGN PATENT DOCUMENTS

| | | |
|---|---|---|
| EP | 0862937 | 9/1998 |
| WO | 03049839 | 6/2003 |
| WO | 2006034765 | 4/2006 |

OTHER PUBLICATIONS

Search Report for PCT/FR2007/052473, mailed Oct. 2008.

* cited by examiner

*Primary Examiner* — Frank Lawrence, Jr.
(74) *Attorney, Agent, or Firm* — Elwood L. Haynes

(57) ABSTRACT

The invention relates to a method for purifying or separating a supply gas flow containing at least one impurity, in which: a) said supply gas flow is contacted with a first adsorbent for the adsorption-removal of at least one said impurity; b) recovering said purified or separated gas; c) heating a regeneration gas containing at least hydrogen ($H_2$) and carbon monoxide (CO) using a heater having a skin temperature ($T_1$) of between 150° C. and 200° C. during the gas heating phase; and d) periodically regenerating the adsorbent of step a) with the regeneration gas heated during step c) at a regeneration temperature ($T_2$) such that: $T_2 = T_1 - \Delta T$ with 5° C. < $\Delta T$ < 50° C.

21 Claims, 1 Drawing Sheet

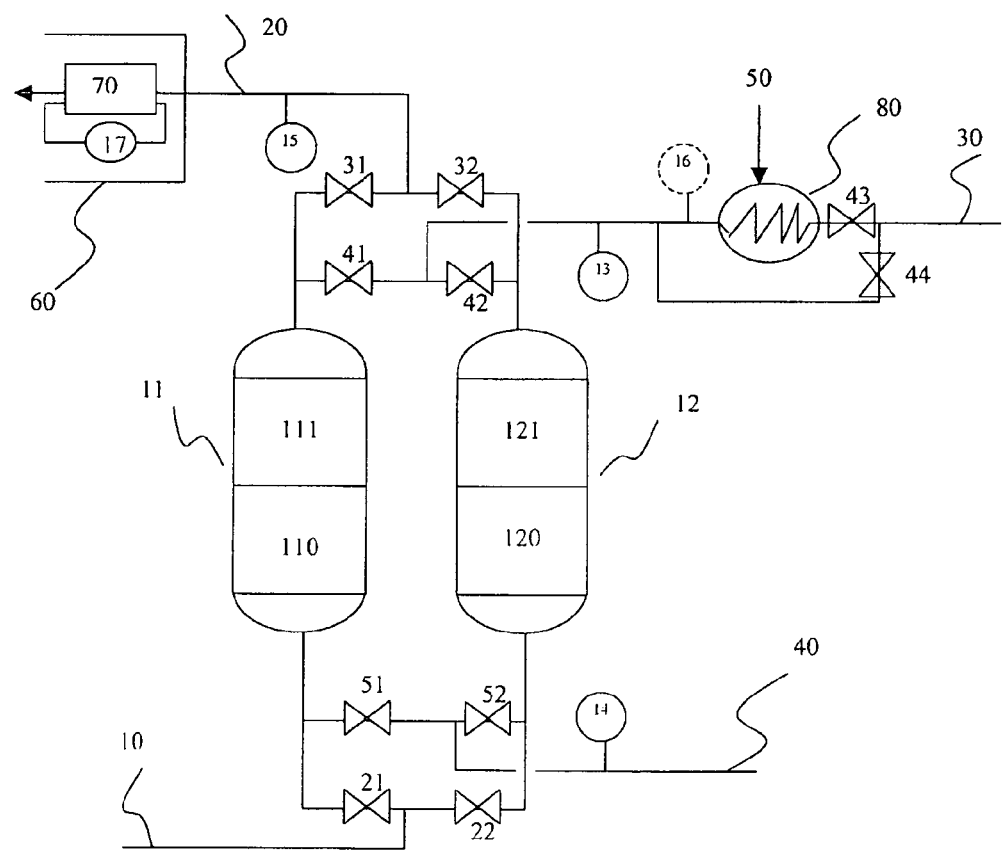

PURIFICATION OF AN H₂/CO MIXTURE WITH HEATER SKIN TEMPERATURE CONTROL

This application is a §371 of International PCT Application PCT/FR2007/052473 filed Dec. 11, 2007.

BACKGROUND

1. Field of the Invention

The invention relates to an adsorption process for purifying a gas mixture rich in hydrogen and carbon monoxide, usually called an $H_2/CO$ mixture or syngas, before it is cryogenically treated for the purpose of producing a CO-rich fraction and/or one or more $H_2/CO$ mixtures of defined content, such as for example a 50 mol % $H_2$/50 mol % CO mixture, and generally a hydrogen-rich fraction.

2. Related Art

Syngas mixtures may be obtained in several ways, especially:

- by steam or $CO_2$ reforming;
- by partial oxidation;
- by hybrid processes, such as the ATR (AutoThermal Reforming) process, which is a combination of steam reforming and partial oxidation, using gases such as methane or ethane;
- by gasification of coal;
- or recovered gases, such as waste gases downstream of acetylene manufacturing units.

In addition to hydrogen and carbon monoxide as main components, many impurities such as carbon dioxide, water or methanol often form part of syngases.

Among purification processes, the TSA (Temperature Swing Adsorption) process is a cyclic process in which each of the adsorbers alternates between adsorption steps, during which the impurities are retained in the adsorbent, and regeneration steps, during which a heating phase is used in particular to extract the impurities from the adsorbent. The typical operating cycle of this type of unit has been described in document WO-A-03/049839.

Units for carrying out TSA purification processes are generally designed so as to obtain a syngas of cryogenic quality, i.e. such that, when said syngas is cooled in the cold box, any deposits of impurities are low enough to ensure satisfactory operation of said cold box for several years, therefore without becoming clogged, without the exchange line suffering thermal deterioration and with no risk to the safety of the equipment.

This is achieved with a maximum residual $CO_2$ content generally of the order of 0.1 ppm and even lower contents, of around 1 ppb, for the other impurities.

To limit intervention on these purification units, they are also designed with initial design margins wide enough to ensure correct operation for several years without having to replace the adsorbents.

Despite all the precautions, it turns out that the lifetime of these units is substantially shorter than initially predicted.

In normal operation, a $CO_2$ analyser is used to check the purity of the gas produced. It enables the cycle to be modified, for example the adsorption phase may be shortened if premature $CO_2$ break-through, due to degradation in the performance of the purification unit as mentioned above, is detected. However, the fact remains that, despite these precautions, after a few years of operation a degradation in the separation performance of the cold box for cryogenically separating syngas is observed.

This lack of performance is attributed to heat exchange deterioration caused by solid deposits on the heat exchanger plates.

Shutting down the unit, to heat (deice) it, enables the problem to be solved but, of course, at a substantial cost if this is not a shut-down programmed in advance. Given the design margins on the heat exchangers taken when designing cold boxes, these effects are felt only after a relatively long period of operation, greater than a year, more generally around 2 to 3 years. This situation makes it impossible to know whether traces of impurities, a priori water and $CO_2$, are being brought by the purified syngas into the cold box after more than one year of service, after several months, or only after a few weeks of operation.

It has been reported that this deterioration stems from chemical reactions between the adsorbent and the adsorbate and/or from reactions between the syngas components, which reactions are promoted by the adsorbent.

The high-temperature reactivity of $H_2/CO$ mixtures is in fact well known, but document U.S. Pat. No. 5,897,686 teaches that several reactions occur during the purification repressurization phase, this being a substep of the regeneration. The above document mentions in particular two reactions:

methanation: $CO + 3H_2 \rightarrow CH_4 + H_2O$;
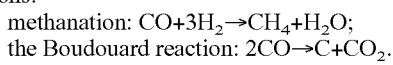
the Boudouard reaction: $2CO \rightarrow C + CO_2$.

According to that document, the problem encountered is due to the formation of water in the adsorbent, and the recommended solution is to add, at the top of the adsorber, a bed of 3A molecular sieve which, by not adsorbing CO, prevents in situ formation of said water. That document recommends a regeneration temperature of between 100° C. and 400° C., which corresponds conventionally to a heater skin temperature of from about 150/200° C. to 450/500° C.

Certain chemical reactions may also be catalysed by deposits of secondary constituents on the surface of the adsorbents. Deposits of metals, such as iron, nickel, copper, etc. promote the aforementioned reactions. The origin of some of these metal deposits in due to the decomposition of metal carbonyls formed upstream of the purification.

Progressive poisoning of the adsorbents by traces of impurities, making it difficult or impossible to regenerate said adsorbents, is also a plausible hypothesis knowing the very large number of side-reaction products that may be produced in synthesis reactors, deriving from the coal or natural gas used as raw material, or that may be entrained from upstream prepurification processes, such as methanol scrubbing or amine scrubbing.

Document WO-A-2006/034765 discloses a process for purifying a stream of gas rich in carbon monoxide and hydrogen, in which the gas stream is brought into contact with an adsorption layer containing a silica gel, and the adsorption layer is regenerated with a gas having a temperature of between 70° C. and 150° C., which normally corresponds to a heater skin temperature of around 150° C. to 200/250° C.

The heater skin temperature is defined as the temperature to which the regeneration gas is heated upon passing through the heater, i.e. the temperature of the heat exchange surface in contact with the gas.

Moreover, it is known that, for a given thermal power (Q) expressed for example in Kcal/h, the heat exchange area (S) to be installed is inversely proportional to the temperature difference $\Delta T$ between the skin temperature $T_1$ of the heating surface and the temperature $T_2$ of the regeneration gas.

From this, it is readily understood that, to reduce the necessary heat exchange area, and consequently the investment, it is necessary to use a skin temperature $T_1$ as high as possible.

Hence it is common practice to use, in the prior art, a skin temperature $T_1$ such that $T_1=T_2+\Delta T$, where $\Delta T \geqq 50°$ C. and preferably with $\Delta T$ around 100° C.

In a refinery or a chemical or petrochemical plant, to heat a fluid to a temperature of 170° C., it is conventional practice to use steam at 250/270° C. or higher.

According to the teaching of document WO-A-2006/034765, the claimed process makes it possible to limit formic acid formation and to extend the lifetime of the adsorbents for said purification.

However, several chemical reactions take place during the heating step, this being a substep of the regeneration.

Despite all these poisoning hypotheses, the main reason for ingress of impurities into to the cold box has yet to be clearly identified.

Hence, one of the problems that arise is how to deliver a syngas of cryogenic quality without having to intervene prematurely on the purification units and/or on the cold box, by providing an effective process intended to purify an $H_2/CO$ mixture containing at least one impurity, so as to prevent or minimize undesirable reactions.

SUMMARY OF THE INVENTION

The solution provided by the invention is therefore a process for the purification or separation of a feed gas stream containing at least one impurity, in which:
a) said feed gas stream is brought into contact with a first adsorbent for eliminating at least said impurity by adsorption;
b) said purified or separated gas is recovered;
c) a regeneration gas containing at least hydrogen ($H_2$) and carbon monoxide (CO) is heated by means of a heater, the skin temperature ($T_1$) of which is between 150° C. and 200° C. during the gas heating phase; and
d) the adsorbent of step a) is periodically regenerated with the regeneration gas heated in step c) at a regeneration temperature ($T_2$) such that:

$$T_2=T_1-\Delta T$$

where 5° C.<$\Delta T$<50° C.

Depending on the case, the process according to the invention may have the following features:
the regeneration temperature ($T_2$) is such that the temperature difference ($\Delta T$) is between 5° C. and 40° C., preferably between 5° C. and 25° C.;
the skin temperature ($T_1$) of the heater is equal to or less than 190° C. and the regeneration temperature ($T_2$) at the inlet of the adsorber is equal to or greater than 150° C.;
the skin temperature $T_1$ is equal to or less than 185° C., preferably equal to or less than 175° C., and the regeneration temperature $T_2$ at the inlet of the adsorber is equal to or greater than 135° C., preferably equal to or greater than 150° C.;
the regeneration gas furthermore contains methane ($CH_4$) and/or nitrogen ($N_2$);
the regeneration heater is a steam heater, the pressure of said steam being less than 15 bar effective, preferably around 8 to 12 bar—the term "effective" emphasizes that this pressure is measured taking the Earth's atmospheric pressure to be zero;
the steam used in the regeneration heater is obtained by expansion of a higher-pressure steam;
the regeneration heater is an electric heater equipped with a means for controlling the skin temperature;
the feed gas contains at least hydrogen ($H_2$) and carbon monoxide (CO);

the hydrogen content of the feed gas is between about 30 and 75 mol % and the carbon monoxide content is between about 25 and 60 mol %;
at least one impurity of the feed gas stream is carbon dioxide $CO_2$;
at least one impurity of the feed gas stream belongs to the group formed by water and alcohols, particularly methanol;
the first adsorbent of step a) contains activated alumina and/or silica gel and/or activated charcoal;
the activated alumina and/or the silica gel and/or the activated charcoal are placed in successive layers in any order or are intimately mixed within at least one adsorption bed;
the activated charcoal is an activated charcoal treated so as more specifically to adsorb secondary impurities chosen from nitrogen oxides, sulfur compounds, amines and decomposition products thereof;
said feed gas stream is brought into contact with a second adsorbent comprising zeolite;
the zeolite is chosen from zeolites of type X, LSX, 4A or 5A;
the partial CO pressure in the regeneration gas heated at step c) is less than 2 bar absolute, preferably less than 1 bar absolute and even more preferably equal to or less than 0.5 bar absolute;
the feed gas is obtained by steam reforming, by partial oxidation, by gasification of coal or residues, or by a hybrid process—"hybrid process" means a combination of steam reforming and partial oxidation; and
the feed gas undergoes a pretreatment, such as an amine or methanol scrubbing treatment, before being purified.

The invention will now be described in greater detail with reference to appended FIG. 1.

BRIEF DESCRIPTION OF THE FIGURES

FIG. 1 illustrates a purification unit for carrying out the process according to the invention.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

The syngas 10 resulting from amine scrubbing is sent via the valve 21, with the valve 22 closed, to the adsorber 11, which consists of an activated alumina bed 110 followed by a zeolite bed 111, in which beds the water and the $CO_2$ contained in the syngas are respectively retained, and the product gas thus purified is sent to the cold box 60 via the valve 31, the valve 32 being closed, and is then injected into the main cryogenic heat exchanger 70.

The regeneration gas 30—a hydrogen-rich fraction also containing CO and/or $CH_4$—is heated during the heating phase upon passing through the steam heater 80 by means of high-pressure or medium-pressure steam 50. The inlet temperature in the adsorber 12 is regulated by means of a temperature sensor 13 and a bypass circuit of the heat exchanger, controlled by the valve 44. At the end of the heating step, the valve 43 is closed and the cold regeneration gas is sent to the adsorber 12, starting to cool the molecular sieve bed 121 stripped of the $CO_2$ adsorbed previously, while at the same time pushing the residual heat front through the activated alumina bed 120. A temperature sensor 14 on the regeneration gas discharge circuit 40 is used to check that the heating and cooling steps are being carried out correctly.

The detailed way in which the unit is controlled and the transient steps and corresponding circuits for stabilized operation of the units upstream and downstream of the purification unit will not be described here for the sake of simplification.

More generally, as regards the main constituents of the syngases conventionally treated in units of this type, the hydrogen content is approximately within the 30 to 75 mol % range and the carbon monoxide content within the 25 to 60 mol % range.

As regards the main impurities, the molar content of carbon dioxide ($CO_2$) may vary between 5 and 500 ppm approximately. If the decarbonation takes place by amine scrubbing, the syngas is also normally saturated with water. In the case of cryogenic alcohol scrubbing, the molar content of residual $CO_2$ may generally be between 20 and 500 ppm. Among alcohols, methanol is the most common impurity.

The pressure of the syngas is generally between 10 and 70 bar, although many units operate between 15 and 50 bar.

The temperature of the feed gas is in the 5 to 50° C. range, more generally between 15 and 40° C. in the case of amine scrubbing and in the −70 to −20° C. range after alcohol scrubbing, generally methanol scrubbing. In the latter case, it is also possible to heat the syngas and carry out a purification at room temperature. The choice is not dictated by just the purification, but also by the overall thermal budgets associated with the combination of scrubbing, purification and cold box.

The throughputs of syngas to be purified may range from a few hundred $Nm^3/h$ to several hundred thousand $Nm^3/h$.

According to the invention, it has been shown that the heater skin temperature plays an essential role in the ingress of impurities into the cold box.

Thus, it has been demonstrated by the inventors of the present invention that the skin temperature of the regeneration heater must be less than 200° C., preferably equal to or less than 175° C., so as not to create traces of moisture in the regeneration gas, and, moreover, the regeneration gas must have, at the inlet of the adsorbers, a high enough temperature, above 130° C., preferably above 140° C. and more preferably around 150° C.

This is because traces of moisture are liable to be trapped on the adsorbents and reduce their adsorbtivity. Moreover, using a relatively low temperature level to regenerate the adsorbents does not promote impurity desorption.

More precisely, if a steam temperature of 200° C. or slightly lower has to be used, given the availability of steam/condensate mains, regeneration must take place at 150° C. or higher, because traces of moisture at a level of a few tens of ppb are probably present in the regeneration gas.

If a cooler steam is available, for example at a temperature of around 175° C., the regeneration may take place at about 130 to 140° C. since the regeneration gas will then be dry.

Owing to the thermal losses and the means for regulating the temperature of the regeneration gas, it may be seen that the sole means of ensuring proper regeneration of the purification unit, i.e. regeneration with a sufficient temperature level and with a dry or practically dry gas, is to use a low temperature difference between the skin temperature $T_1$ and the regeneration temperature $T_2$.

It is therefore necessary to overdesign the heat exchanger, so as to limit the skin temperature $T_1$ to about 175° C., while still having a temperature of around 140 to 150° C.

It may also be advantageous to use improved insulation.

If in the adsorbent there are compounds that may decompose or polymerize or may attack the adsorbent structure at high temperature, it is recommended to reach the final regeneration temperature in stages, for example one hour at 80° C., then one hour at 120° C. before carrying out the actual regeneration at 150° C. or higher. As a variant, it is possible to increase the regeneration temperature using a temperature ramp, for example a 1 to 2° C. per minute ramp.

A steam regeneration heater may be used within the context of the invention. In this case, one means of limiting the maximum temperature is to use low-pressure steam, particularly steam at a pressure equal to or less than 15 bar effective, preferably 8 to 12 bar.

However, conventional steam mains found in petrochemical plants of this type are generally at higher pressures, above 20 bar. This means that the available pressure levels cannot be used directly, the steam having to be expanded down to 15 bar effective, preferably 8 to 12 bar, from a higher pressure.

An electric heater may also be used. In this case, the heater skin temperature is limited to a maximum temperature using a method defined during the design of the heater. This may involve controlling the wall temperature of the heating element by means of one or more temperature sensors for regulating the electrical power. Other means are possible depending on the technology used, it being possible for regulation to be internal to the equipment (self-regulation), in this case forming part of the equipment specification, or external to the equipment, the temperature regulation in question then being undertaken in the central control system in the same way as the other types of regulation of the syngas processing unit.

Although the temperature is the main factor in the occurrence of undesirable reactions because of kinetic limitation, a higher CO content may have a negative effect. To regenerate the adsorbent at least during the heating phase, it will be preferable to choose a gas stream carrying a CO partial pressure of less than 2 bar, preferably less than 1 bar and even more preferably less than 0.5 bar.

The regeneration throughput used, expressed as a percentage of the syngas throughput, can vary widely depending on the unit. It may range from around 5% to 50% and higher, depending on the separation process involved. It essentially depends, on the one hand, on the stream available for carrying out the regeneration—sizeable if the regeneration gas is a hydrogen fraction but very limited if it is a waste or purged gas—and, on the other hand, on the temperature and pressure conditions for said purification with, for example, limited requirements in the case of a low-temperature high-pressure syngas.

If a low-temperature heater is used, then regeneration throughputs of less than 10% of the syngas throughput are preferentially used.

Regenerating the adsorber at a temperature below 150° C. means using adsorbents that can be regenerated below this temperature level. To stop water or alcohols, generally methanol, activated alumina and/or silica gel and/or activated charcoal will therefore be preferentially used, these being known for their lower affinity with water or alcohols than zeolite X or zeolite A.

To stop the $CO_2$, a zeolite or a doped activated alumina may be conventionally used.

In the presence of identified secondary impurities deriving from upstream processes, a specific active charcoal bed as first adsorbent layer, mixed with another adsorbent, or else before the zeolite bed, may be added or used. The secondary impurities may be, depending on the upstream process, nitrogen oxides, sulfur-containing products, amines, decomposition products thereof, and traces of acids, such as HCN, or mercury.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the purification or separation of a feed gas stream containing at least one impurity, comprising:
    a) said feed gas stream is brought into contact with a first adsorbent for eliminating at least said impurity by adsorption, thereby producing a purified gas;
    b) said purified gas is recovered;
    c) a regeneration gas containing at least hydrogen and carbon monoxide is heated by means of a heater,
        I. said heater having a heat exchange surface, and said heat exchange surface having a skin temperature ($T_1$) defined as the temperature of the heat exchange surface that is in contact with the gas,
        II. said skin temperature is between 150° C. and 200° C. during the gas heating phase; and
    d) the adsorbent of step a) is periodically regenerated with the regeneration gas heated in step c) at a regeneration temperature ($T_2$) such that:

$$T_2 = T_1 - \Delta T$$

where the temperature difference ($\Delta T$) is 5° C. < $\Delta T$ < 50° C.

2. The process of claim 1, wherein the regeneration temperature is such that the temperature difference is between 5° C. and 40° C.

3. The of claim 1, wherein the skin temperature of the heater is equal to or less than 190° C. and in that the regeneration temperature at the inlet of the adsorber is equal to or greater than 150° C.

4. The process of claim 1, wherein the regeneration gas further comprises methane and/or nitrogen.

5. The process of claim 1, wherein the regeneration heater is a steam heater, the pressure of said steam is less than 15 bar gauge.

6. The process of claim 1, wherein said regeneration heater is an electric heater equipped with a means for controlling the skin temperature.

7. The process of claim 1, wherein the feed gas contains at least hydrogen and carbon monoxide.

8. The process of claim 1, wherein the hydrogen content of the feed gas is between about 30 and 75 mol % and in that the carbon monoxide content is between about 25 and 60 mol %.

9. The process of claim 1, wherein at least one impurity of the feed gas stream is carbon dioxide.

10. The process of claim 1, wherein at least one impurity of the feed gas stream belongs to the group formed by water and alcohols.

11. The process of claim 1, wherein the first adsorbent of step a) contains at least one element selected from the group consisting of activated alumina, silica gel, and activated charcoal.

12. The process of claim 1, wherein the first adsorbent of step a) contains at least two elements selected from the group consisting of activated alumina, silica gel, and activated charcoal , and wherein the at least two adsorbent elements are placed in successive layers in any order within at least one adsorption bed.

13. The process of claim 1, wherein the first adsorbent of step a) contains at least two elements selected from the group consisting of activated alumina, silica gel, and activated charcoal , and wherein the at least one adsorbent elements are intimately mixed within at least one adsorption bed.

14. The process of claim 12, wherein the activated charcoal is an activated charcoal treated so as more specifically to adsorb secondary impurities chosen from nitrogen oxides, sulfur compounds, amines and decomposition products thereof.

15. The process of claim 13, wherein the activated charcoal is an activated charcoal treated so as more specifically to adsorb secondary impurities chosen from nitrogen oxides, sulfur compounds, amines and decomposition products thereof.

16. The process of claim 1, wherein said feed gas stream is brought into contact with a second adsorbent comprising zeolite.

17. The process of claim 16, wherein the zeolite is selected from the group consisting of zeolites of type X, LSX, 4A and 5A.

18. The process of claim 1, wherein the partial CO pressure in the regeneration gas heated at step c) is less than 2 bar absolute.

19. The process of claim 1, wherein the feed gas is obtained from a process selected from the group consisting of steam reforming, partial oxidation, gasification of coal, gasification of residues, and a hybrid process.

20. The process of claim 1, wherein the feed gas undergoes a pretreatment before being purified.

21. The process of claim 1, wherein the pretreatment is an amine or methanol scrubbing treatment.

* * * * *